US007869447B2

(12) United States Patent
Westberg et al.

(10) Patent No.: US 7,869,447 B2
(45) Date of Patent: Jan. 11, 2011

(54) METHOD AND SYSTEM FOR MULTI-DOMAIN VIRTUAL PRIVATE NETWORK CONFIGURATION

(75) Inventors: Lars Westberg, Enköping (SE); Jan-Erik Mångs, Solna (SE); Christofer Flinta, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1146 days.

(21) Appl. No.: 11/170,185

(22) Filed: Jun. 30, 2005

(65) Prior Publication Data
US 2006/0018300 A1 Jan. 26, 2006

(30) Foreign Application Priority Data
Jun. 30, 2004 (WO) ................ PCT/SE2004/001065

(51) Int. Cl.
*H04L 12/28* (2006.01)
(52) U.S. Cl. ....................................... 370/401; 370/254
(58) Field of Classification Search ................. 370/254, 370/401
See application file for complete search history.

(56) References Cited

U.S. PATENT DOCUMENTS

| 7,281,039 | B1* | 10/2007 | Salkewicz | 709/223 |
|---|---|---|---|---|
| 7,389,534 | B1* | 6/2008 | He | 726/15 |
| 7,403,980 | B2* | 7/2008 | Stringer-Calvert et al. | 709/220 |
| 2003/0117954 | A1* | 6/2003 | De Neve et al. | 370/230 |
| 2004/0034702 | A1* | 2/2004 | He | 709/224 |
| 2005/0063411 | A1* | 3/2005 | Wang et al. | 370/437 |

FOREIGN PATENT DOCUMENTS

EP          1 156 625          11/2001

* cited by examiner

*Primary Examiner*—Derrick W Ferris
*Assistant Examiner*—Christopher R Crompton
(74) *Attorney, Agent, or Firm*—Nixon & Vanderhye P.C.

(57) ABSTRACT

Information about virtual private networks—VPNs—in each domain of a multi-domain communications system is provided. By comparing a request for a configuration of a VPN with the provided information of other connected domains, a match can be found. VPN configuration can then be performed based on the outcome of the match. The provided domain VPN information is in one embodiment spread to other domains under constrictions put by SLAs between domain operators. The spreading of VPN information can be performed regularly or triggered by an external event. In another embodiment, the VPN configuration request is instead spread to different domains.

49 Claims, 10 Drawing Sheets

METHOD AND SYSTEM FOR MULTI-DOMAIN VIRTUAL PRIVATE NETWORK CONFIGURATION

TECHNICAL FIELD

The present invention relates in general to virtual private networks in communications systems and in particular to configuration of virtual private networks in multi-domain communications systems.

BACKGROUND

A Virtual Private Network (VPN) utilizes a public or private communications network to conduct private communications. Traditionally, a company or other customer that wanted to build a wide-area network had to provide for its own dedicated lines between each node to provide the connectivity. Such solutions are, however, generally expensive and inflexible. During the last years, the concept of VPNs has evolved rapidly. VPNs offer a solution, where a communications network is shared between many customers, but where the communication of each customer is virtually separated. VPN technology is often based on the idea of tunneling. Network tunneling involves establishing and maintaining a logical network connection. On this connection, packets are encapsulated within some other base or carrier protocol. They are then transmitted between VPN client and server and eventually de-encapsulated on the receiver side. Authentication and encryption assists in providing security.

A tendency is that the number of network nodes that form a VPN grows fast, which results in large complex network structures and topology. This is caused, partly because of the increasing traffic on VPNs and partly on that the VPNs are requested to cover larger and larger geographical areas. Communication networks providing VPNs having nodes at all continents are present today. However, the more nodes and the more traffic that is to be transmitted, the more complex the configuration of VPNs becomes. Conventionally, a VPN is created according to an agreement between a network operator and a customer. The location of the nodes, the quality of service and other conditions are agreed on and a programmer at the operator sets up the configuration manually or by consulting configuration aid tools. When having more and more complex communications networks, such configuration becomes more and more complex and time consuming. Furthermore, when a customer wants to modify its VPN, the entire procedure has to be repeated.

When setting up VPNs in a network, different technologies can also be used. Each technology has its own benefits and drawbacks and its own way of configuring the VPNs. There is no general VPN architecture that is independent of VPN technology.

SUMMARY

A general problem is that communications networks providing virtual private networks having a large geographical coverage and/or having large traffic become very complex. A further problem is that configuration of new VPNs or modifications of already existing VPNs become complex and time consuming. A further problem is that communication resources of network operators covering smaller geographical areas cannot be generally utilized for wide-area VPNs.

A general object is to improve configuration of VPNs as well as providing systems and devices suitable therefore. A further object is to provide for configuring VPNs utilizing more than one network domain. Another further object is to provide for configuring of VPNs that are basically independent on the actual VPN technology used. Yet a further object is to provide for automatic configuration of a VPN.

The above objects are achieved by methods and devices according to the enclosed patent claims. In general words, information about VPNs in a domain is provided. By comparing a request for a configuration of a VPN with the provided information of other connected domains a match can be found. The re-configuration can then be performed based on the outcome of the match. The provision of domain VPN information can be performed in different ways, e.g. collection of data in a centralized or distributed manner, or by retrieving stored data. A distributed VPN control node is in particular embodiments localized to border nodes of a domain. The domain VPN information is in particular embodiments collected from the edge nodes of the domain. This can be performed by passively extracting broadcasted information from the edge nodes, by requesting domain VPN information from the edge nodes or a combination thereof. The collection can be triggered by an external event, such as a VPN configuration request. The provided domain VPN information is in one embodiment spread to other domains under constrictions put by SLAs between domain operators. In another embodiment, the VPN configuration request is instead spread to different domains. The matching can thus be performed at various distances from the originally requesting domain.

One important advantage with this technology is that it provides a simple and stable platform on which operators of different domains can co-operate. The domain VPN information is made available for supporting VPN configuration in essentially all domains of a multi-domain system. However, at the same time, in one embodiment, the actual information is spread over the multi-domain system constricted by different agreements between the operators.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
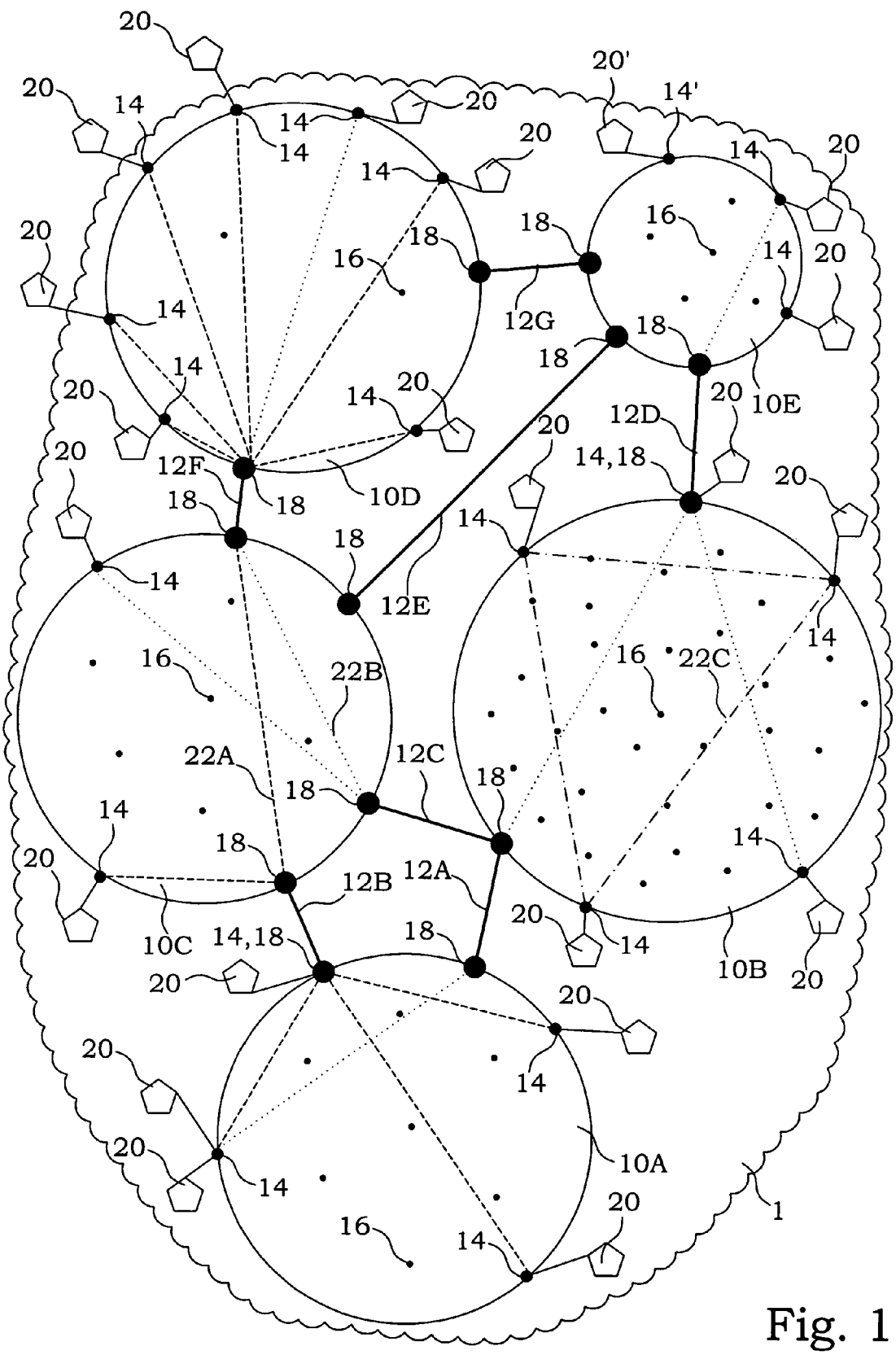
FIG. 1 is a schematic illustration of a multi-domain communications network providing virtual private networks.

An embodiment of a general VPN provider architecture 1 is illustrated in FIG. 1. In this VPN Provider Architecture, there are five VPN Provider Domains 10A-E present, which are attached to each other by interdomain data connections 12A-G. One operator may control one or more of these domains 10A-E, or they can all be controlled by separate operators. The relation between the domains 10A-E, i.e. the control of the interdomain data connections 12A-G are typically regulated according to agreements between the involved operators, e.g. a VPN Service Level Agreement (SLA). Each VPN provider domain 10A comprises VPN edge nodes 14 and core nodes 16, which can be VPN aware or VPN unaware, of which only a few are provided with reference numbers. The VPN edge nodes 14 are nodes through which customer sites 20 of different customers are connected to different VPN's in the architecture 1. VPN unaware nodes 16 are just intermediate nodes within a domain and are only used for forwarding messages and data between VPN edge nodes 14. The customers are unaware of which VPN unaware nodes that are used for the communication. The important matter is the starting and ending VPN edge node 14. A VPN connected in a domain can thus be represented by a direct line between VPN edge nodes 14, even if the actual communication may take place via one or several VPN unaware nodes 16. In the remaining part of the present disclosure, the existence of VPN unaware nodes will in general be neglected, since the basic procedural steps are not directly dependent on the existence of any VPN unaware nodes 16 or not. In the practical implementation, it is, however, likely that VPN unaware nodes 16 are used for providing the actual connectivity.

The VPN provider domains 10A-E are connected in a data plane via VPN border nodes 18, i.e. the interdomain data connections 12A-G start and end in a VPN border node 18. The VPN border node 18 may or may not at the same time also act as a VPN edge node 14. A customer site 20 is connected to one of the VPN edge nodes 14. Customer sites 20 of the same customer may then be connected through the VPN provider domains 10A-E by a VPN 22A-C. One customer may have customer sites 20 connected to different VPN's 22A-C. Also, more than one customer site 20 can be connected to the same VPN edge node 14, but will be unaware of the existence of the other customer site 20 as well as of the VPN to which the other customer site 20 is connected.

In the present embodiment, three VPN's 22A-C are illustrated. However, anyone skilled in the art realizes that the number of VPN's in a real system typically is much higher. A first VPN 22A, illustrated by broken lines, is extended over three domains 10A, 10C, 10D and connects customer sites 20 in all of these domains. A second VPN 22B, illustrated by dotted lines, is extended over all domains 10A-E of the present embodiment. Finally, a third VPN 22C, illustrated by a dash-dotted line, connects customer sites 20 only within the domain 10B. Each customer site 20 is unaware of the existence of customer sites 20 of other customers as well as of the existence of any VPN's except the one it is connected to. In such a manner, the privacy character of the VPN's is preserved, although they all share the same basic communications resources. This is the scenario in which the example embodiments preferably operate.

In the present disclosure, different connections are discussed—interdomain, intradomain, user plane connections, control plane connections, overlay control connections, connections between nodes and user terminals etc. It is assumed throughout the entire description that these connections can be of any kind. The description does not depend on the actual connection technology. This means that both wired and wireless technologies can be used for any of these connections. In particular, concerning the use of wireless connections, the user terminals can be mobile relative to the edge nodes. The nodes within a domain can be mobile relative to the other nodes. Even the domains may be mobile relative to each other.

Now, consider that a new customer site 20' is connected to a VPN edge node 14' in domain 10E. If the customer site 20' wants to be connected to VPN 22B, the procedures are probably relatively simple, since the VPN 22B already is present within domain 10E. Manual or automatic VPN reconfiguration procedures may be employed, as well as mixes therebetween. However, if the new customer site 20' wants to connect to VPN 22A or 22C, the situation becomes more difficult. In prior art, there are no general interdomain VPN configuration procedures.

The following description is based on three part activities. One part concerns provision of domain VPN information, comprising in its most basic version VPN identity of VPNs available in the respective domain. Another part concerns searching for a specific VPN to connect to. This is in other words a matching between a requested VPN and provided domain VPN information. In some embodiments, this matching procedure comprises transferring of domain VPN information or information derived therefrom to other domains. In other embodiments, a request for a certain VPN is instead transferred between domains. The final part concerns the actual re-configuring of a VPN. The focus below is mainly on the two first stages.

Figure 2A:
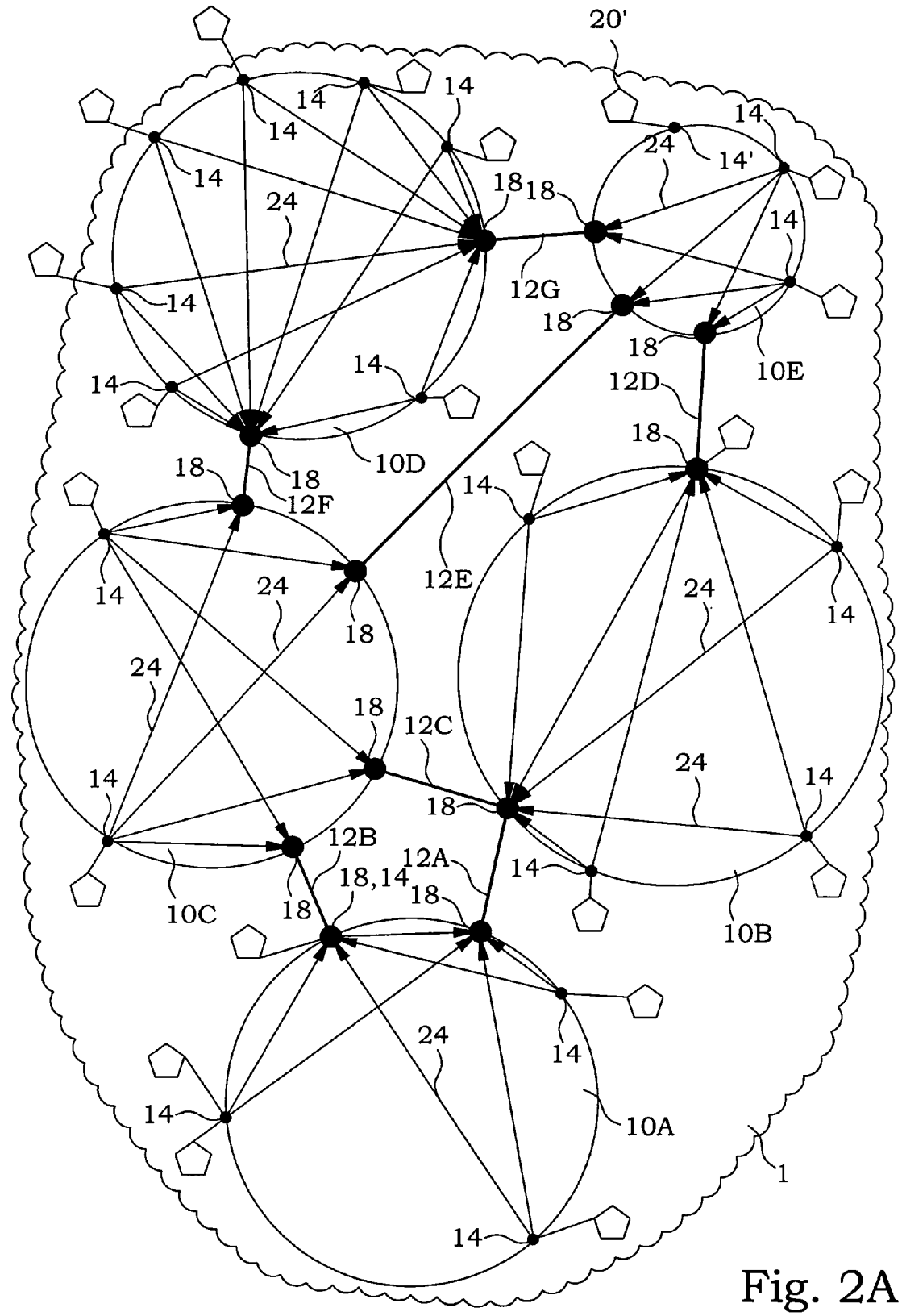
FIG. 2A is a schematic illustration of VPN information collection according to an example embodiment.

FIG. 2A illustrates an embodiment of an initial phase of providing domain VPN information. Each VPN edge node 14 has stored information reflecting its own present VPN configuration regarding at least which VPN's that have connected customer sites at that particular VPN edge node 14. In particular embodiments, the VPN edge node 14 has information also about which customers that are connected to the VPN edge node 14 and associations between the present VPN's and customer sites 20. In some embodiments, information, such as VPN address space and address type (local or global), VPN quality of service classes, specified by requirements such as bandwidth, delay and jitter, and/or VPN set-up, i.e. use of tunnels or filters is provided. Also information such as encryption properties, transparency layer properties, tunneling properties and topology properties can be included. Furthermore, the VPN border nodes 18 have stored information about the identity of the VPN provider domain it belongs to.

According to one embodiment, the domain VPN information stored in each VPN edge node 14, or at least parts thereof, is collected by each border node 18 in the same domain 10A-E. This is visualized in FIG. 2A as arrows, of which some are provided with reference number 24. In such a way, the collective domain node information for the own domain is available in each VPN border node 18 of each domain 10A-E. One alternative for the communication is to use a communication protocol similar to BGP (Border Gateway Protocol), spreading the information all over the domain without any particular knowledge about where the need for information is. The border nodes may then pick up all necessary information. This is an example of a push mechanism for distributing domain VPN information.

Figure 2B:
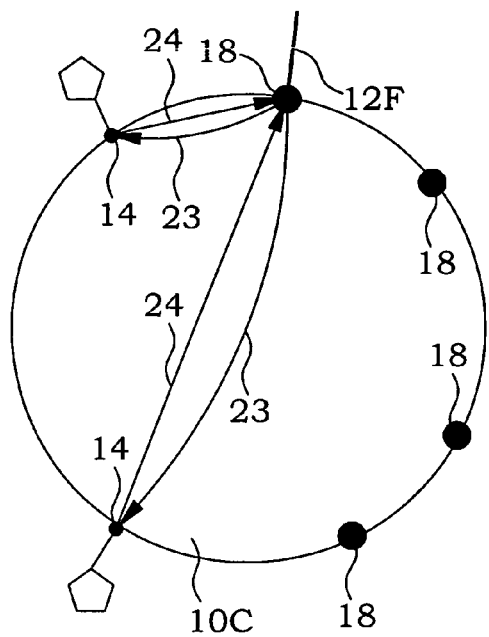
FIGS. 2B-D are schematic illustrations of VPN information collection according to other example embodiments.

FIG. 2B illustrates another embodiment for providing domain VPN information, now concentrated to one domain 10C. If the VPN border nodes 18 has stored information about which edge nodes 14 that are present in the same domain 10C, the VPN border node 18 can simply request 23 any VPN edge node 14 to return its domain node information 24. In the most simple form of requesting information, the request itself could be a question if the VPN edge node 14 is associated to a certain VPN or not, e.g. received by the domain interconnection 12F. An acknowledgement message will in such a case not comprise any information as such, but will implicitly transfer information of this particular VPN at that particular VPN edge node. This is an example of a pull mechanism for distributing domain VPN information.

The domain node information can also be collected with different timing. One alternative is to continuously or at least regularly collect such information to the border nodes in order to assure that the available information always is updated. In such embodiments, the information is preferably stored in the border nodes or in any other node where it is retrievable from the border node, see embodiments described further below. Another alternative is that the information collection is triggered by some event. This event could e.g. be a broadcasting message from an edge node that there is a change of some kind or, as being described above, a request for finding a particular VPN. If all edge nodes have knowledge about which border nodes that are available in the domain, the information could also be sent directly to all border nodes when such a change occurs. In case the information is searched as triggered by a request to find a certain VPN, the collected information may be restricted to that VPN and may not even necessarily be stored for later use.

Figure 2C:
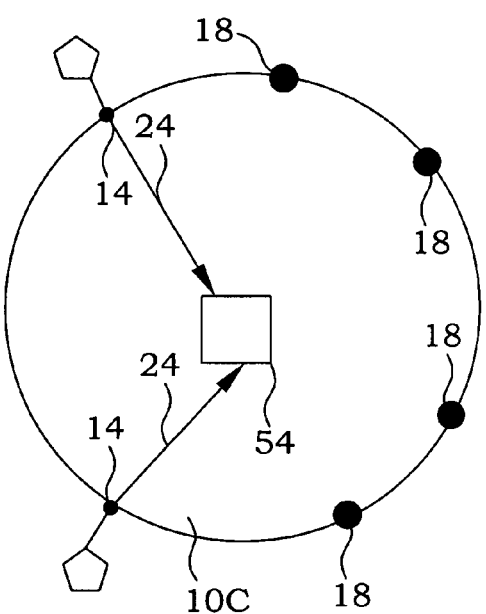

FIG. 2C illustrates an embodiment, where the domain VPN information is collected in a centralized manner. A storage 54 is provided to store all domain VPN information 24 provided by the different edge nodes 14. Any functionalities using such domain VPN information can the retrieve this information from the central storage 54.

Figure 2D:
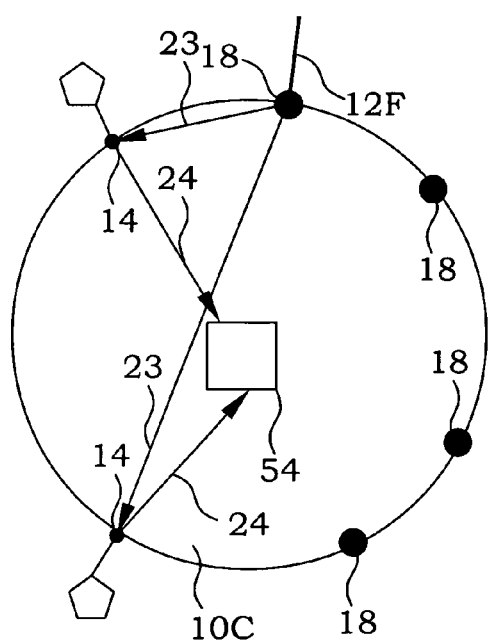

FIG. 2D illustrates another embodiment based on a centralized collection of domain VPN data. Here, a request 23 or other external signal can initialize the provision of VPN data 24 to the storage 54. This request 23 does not necessarily have to come from the storage itself 54.

As an alternative to collect domain VPN information among the domain nodes, the domain VPN information may instead be provided by retrieving data from a data storage. This stored data could e.g. be the result of a previous collection of data according to the procedures above, or could be provided from elsewhere.

Figure 3A:
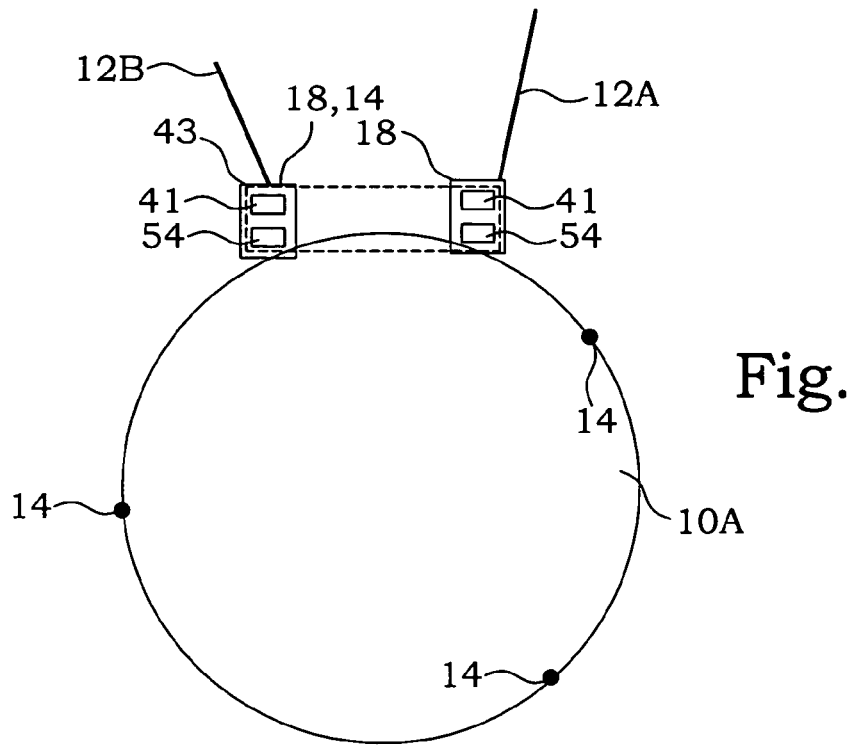
FIGS. 3A-D are example embodiments of VPN control node configurations within a domain.

In the previously described embodiment, the provision of data within a domain is executed by the border nodes or a node in direct association therewith. Such a situation is also illustrated in FIG. 3A. Here, one domain 10A in a multidomain system is illustrated more in detail. The border nodes 18 are responsible for the data traffic to and from other domains by the data connections 12A and 12B. The border nodes 18 comprise in this particular embodiment means 41 for collecting domain VPN information, in the form of e.g. software functionality in the processors of the border node 18. The domain VPN information can be stored in a storage 54. A VPN control node 43 for handling domain VPN information regarding the domain as a whole is thus in this particular embodiment implemented as a distribution of local means 41 at every border node 18.

Figure 3B:
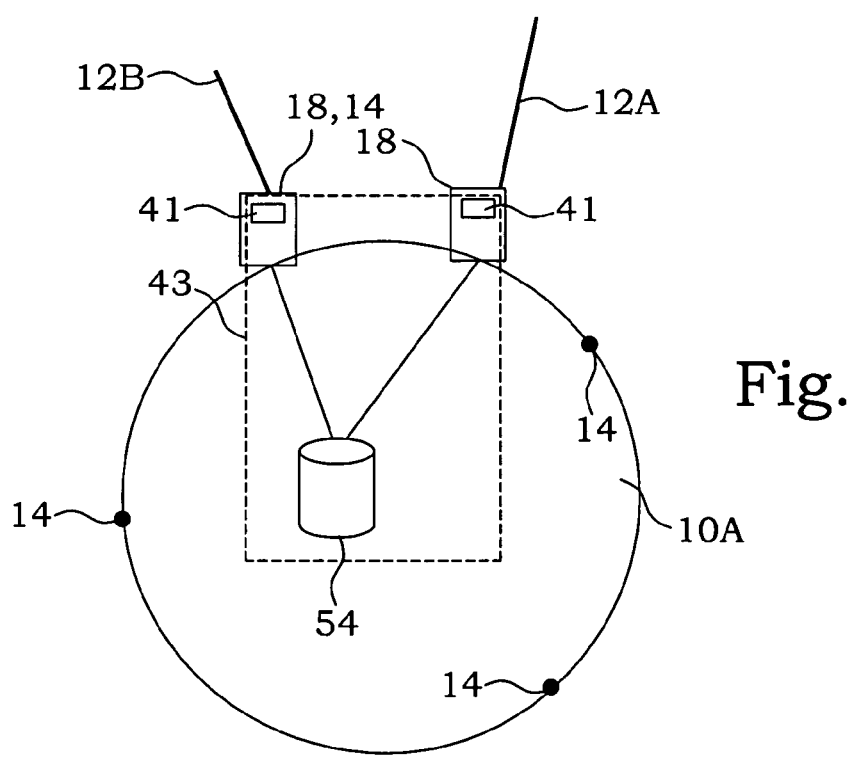

In FIG. 3B, another particular embodiment is illustrated. Here, the border nodes 18 still comprise functionality entities 41 involved with domain VPN information. However, a distributed VPN control node 43 comprises in this particular embodiment means 41 for providing domain VPN information situated in or in connection with the border nodes 18 and a central database 54. In the central database 54, the actual updated and preferably also historical VPN information is stored.

Figure 3C:
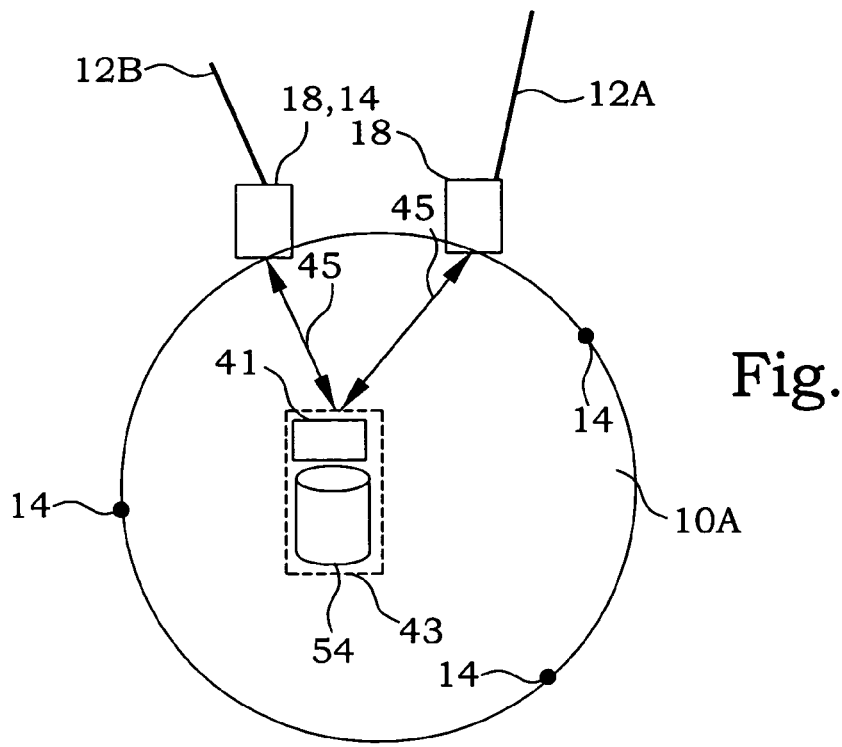

In FIG. 3C, yet another particular embodiment is illustrated. Here, the VPN control node 43 is centralized and comprises the means 41 for providing domain VPN information and the central database 54 basically provided at the same location. The border nodes 18 are in this particular embodiment merely used for handling communications 45 between the VPN control node and neighboring domains. Functionalities in the border nodes 18 regarding control signaling associated with the actual data traffic can in such a way be utilized also to signal control messages concerning VPN configuration.

Figure 3D:
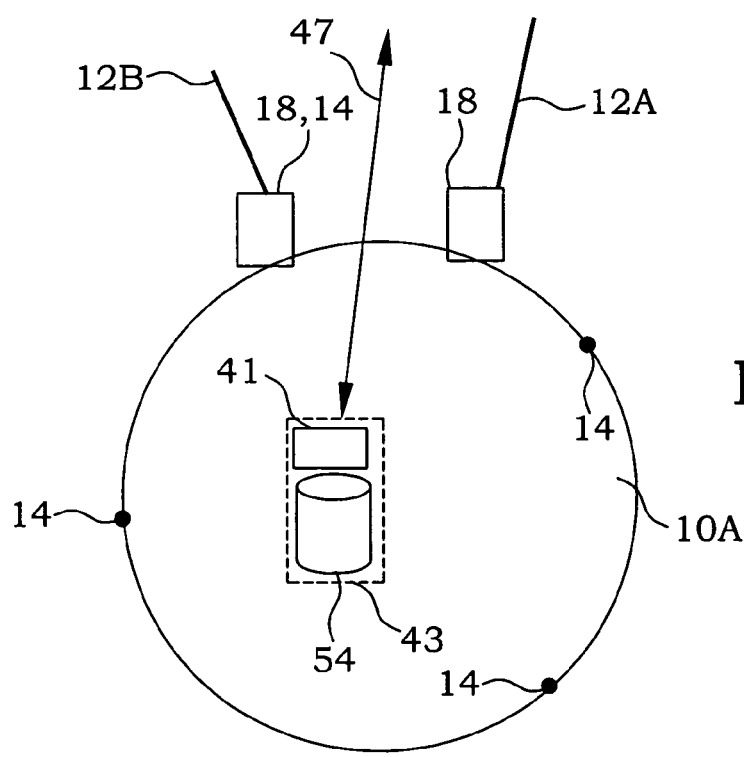

In FIG. 3D, an embodiment having a VPN control node 43 that is virtually separated from the border nodes in the system is illustrated. The VPN control node 43 is in such an embodiment connected to VPN control nodes in other domains by dedicated VPN control signal connections 47, creating a high-level network of its own.

Figure 4:
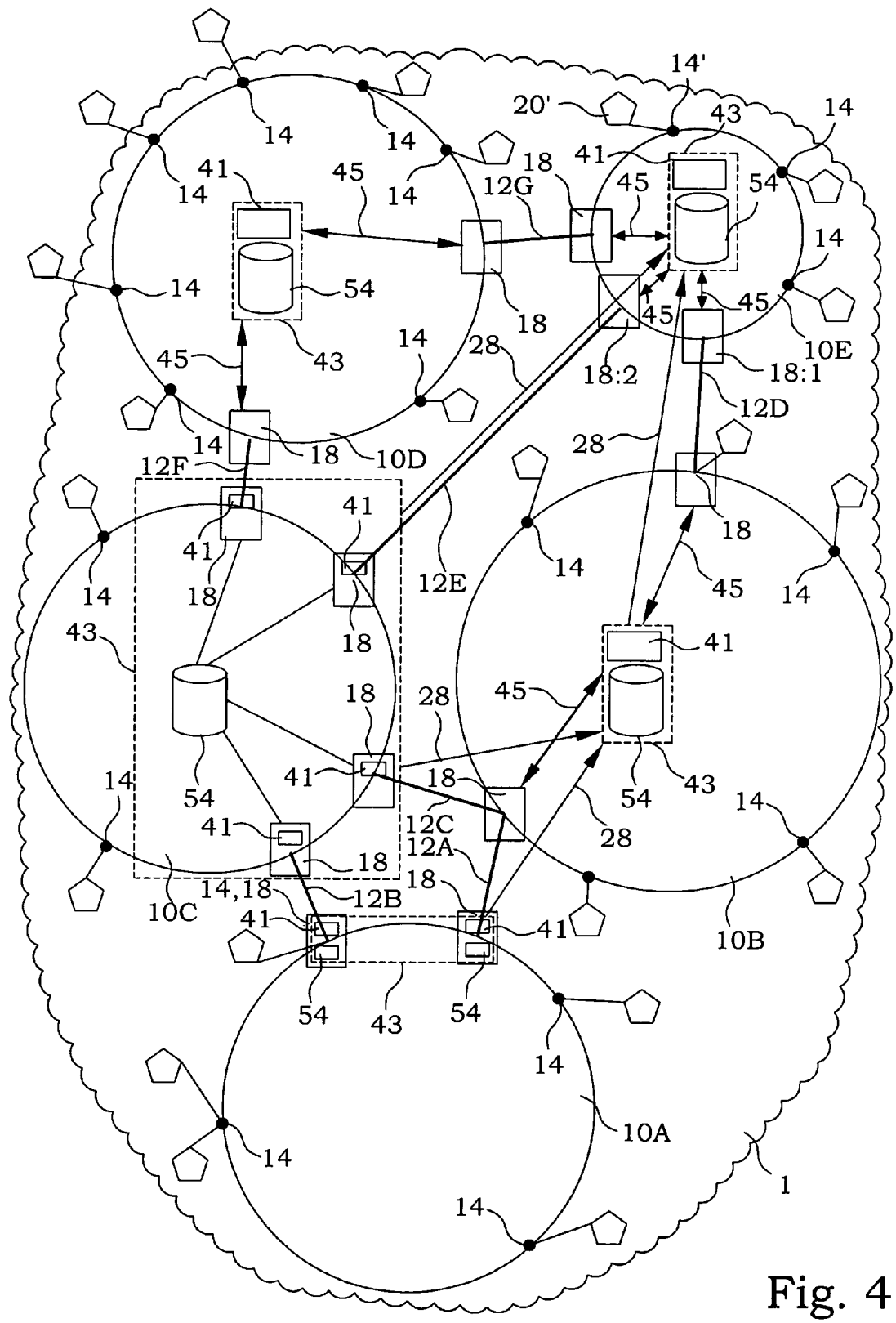
FIG. 4 is a schematic illustration of VPN information forwarding and connect requests according to an example embodiment.

In a particular example embodiment, the provided domain VPN information can be transferred within the system, i.e. between the different domains. This is illustrated in FIG. 4. The first step is provision of VPN information within each domain. This is performed by a VPN control node 43 in each domain. However, the configuration of the VPN control nodes 43 may differ between the different domains. In FIG. 4 it is indicated that domain 10A has a VPN control node 43 similar to the example shown in FIG. 3A, domain 10C has a VPN control node 43 similar to the example shown in FIG. 3B and domains 10B, 10D and 10E have VPN control nodes 43 similar to the example shown in FIG. 3C. According to each SLA regulating the traffic between the different domains, at least a part of the available domain VPN information in each VPN control node 43 is in this embodiment transferred to the counteracting VPN control node in the neighboring domains. Arrows 28 illustrate this interdomain transfer of information. The SLA may comprise agreements about how much of the available information that should be made available for the neighboring domain. In a general case, the VPN control node processes available intradomain VPN information into compiled or processed VPN information that is suitable to forward to neighboring domains. If the domains are closely related, e.g. belonging to the same operator, the SLA could involve a total transparency in exchanging domain VPN information. In other cases, the processed information 28 that is transferred between the VPN control nodes 43 may be compiled VPN information, only revealing very basic fact about the individual domain VPNs. The minimum information that has to be sent over the interdomain connections 12A-G in the present embodiment is the identities of the VPN's that are available somewhere beyond the border node that sends the information.

The information 28 sent on the interdomain connections 12A-G causes an update of the total available VPN information situation at the receiving VPN control node. This VPN control node now also has information e.g. of what VPN's that are available via the interdomain connections. If more thorough information is available, the VPN control node may also determine e.g. edge node identities at which these different VPN's are available, VPN quality of service etc. The so achieved VPN information is now a property of the neighbor domain and can, if allowed by the SLA, be used for activities in that domain. The information stored in the storage 54 of the VPN control node 43 could be identical to the information received from the neighboring domain or a processed version thereof, adding, removing or modifying the received information. For instance, the information could be labeled with an indication from what domain it originated from.

This information distribution may continue in many successive steps, in some cases applying further modification of the information before forwarded to another domain, in analogy with the first transfer. Eventually, all VPN control nodes in the entire VPN provider architecture 1 has at least a processed version of all domain VPN information available in the system. At each VPN control node, the information may be processed according to the SLA that is valid for the associated interdomain connection to be used.

In an alternative embodiment, information distribution between domains can be performed in a broadcast push manner. The domain VPN information is then sent directly to one, several or all of the other VPN control nodes in the other domains in the total system, not restricted to the neighboring domains. This means that the domain VPN information is not forwarded in a chain as in the other embodiment, but merely broadcasted through the system. The availability of such direct request forwarding can be regulated by domain SLAs.

The exchange of domain VPN information can be performed with different timing. One alternative is to continuously or at least regularly exchange such information in order to assure that the available information always is updated. In such embodiments, the information is preferably stored in the VPN control nodes or in any other node, where it is retrievable by the VPN control node. In other words, this alternative is a typical push mechanism for data distribution.

Another alternative is that the information exchange is triggered by some event. This event could e.g. be that a change of some kind has occurred in a domain or, as being described below, a request for finding a particular VPN is issued. In other words, this alternative can be described as a triggered push mechanism for data distribution.

In case the information is exchanged as triggered by a request to find a certain VPN, the exchanged information may be restricted to that VPN and may not even necessarily be stored for later use. This is an example of a pull mechanism for data distribution.

Now, consider the connection of a new customer site 20' to an edge node 14' intended to be connected to a certain VPN. In a particular embodiment, the connection will initiate a "plug-and-play" procedure that automatically will find the appropriate VPN and at least suggest how to arrange the revised VPN configuration. The control node 43 identifies that a new customer site 20' is connected and investigates which VPN it is intended for.

When a VPN control node 43 initiates a VPN connection request, it compares the requested VPN to the stored information about VPN's that is available through its interdomain connections. If there is a match, information about the existence of the match and preferably also about in which domain the VPN exists and through which interdomain connections the VPN is reachable is available. In one embodiment, the path to reach an edge node connected to the requested VPN, if it is available, is returned to the requesting VPN control node. In FIG. 4, the requested VPN is the VPN 22A of FIG. 1. VPN control node 43 of domain 10E has information about that VPN 22A is available through border node 18:1 according to two different paths. One alternative to reach VPN 22A is over interdomain connection 12D, through domain 10B and over interdomain connection 12A. The VPN 22A is then present within domain 10A. Another alternative to reach VPN 22A is over interdomain connection 12D, through domain 10B and over interdomain connection 12C. The VPN 22A is then present within domain 10C. However, the VPN control node 43 of domain 10E has also information about VPN 22A via another border node 18. Here, the requested VPN 22A is reachable over interdomain connection 12E, since VPN 22A is available in domain 10C. Finally, the requested VPN 22A is reachable over interdomain connection 12G, since VPN 22A is available also in domain 10D.

The VPN control node 43 has all necessary information for finding the requested VPN. In this example, the route over interdomain connection 12E seems most simple to use, but e.g. available quality of service levels may change such decisions.

In this particular embodiment, the provided domain VPN information is spread to all VPN control nodes 43 of the entire system 1. In such a way, a request for finding a suitable VPN can be put directly to a VPN control node 43 of the "home" domain. The provision and exchanging of VPN information can as indicated before be performed continuously, regularly or even trigged by the request itself.

Figure 5:
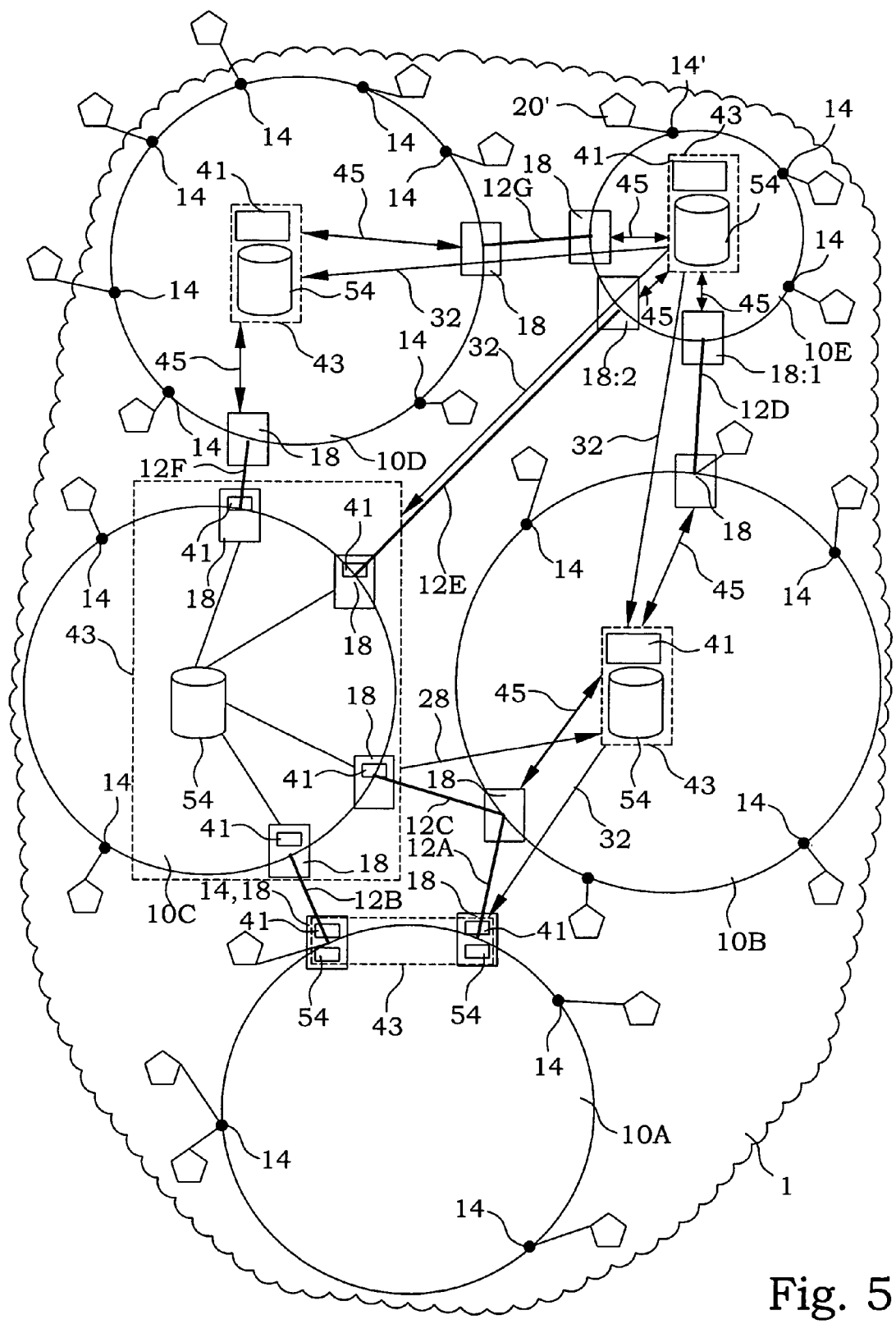
FIG. 5 is a schematic illustration of VPN information forwarding and connect requests according to another example embodiment.

Another particular example embodiment is illustrated in FIG. 5. Here, the initial intradomain VPN information provision is performed just as before. In this particular embodiment, however, the domain VPN information is not brought forward to any neighboring domain, even in a processed form. This means that the VPN control nodes 43 now only have information about its own domain VPN's. When the VPN control node 43 initiates a connect request of the VPN control node 43 of its own domain 10E, it does only have the information about VPNs in the own domain readily available in its own databases. However, the VPN control node 43 knows what domains it is connected to and forwards instead the request over the interdomain connection 12A-G to the neighboring domains. This is illustrated by the arrows 32. A VPN control node 43 receiving such request over an interdomain connection investigates its own databases to see if there are any data of interest. If not, a new forwarding over an interdomain connection will take place until information about the requested VPN is achieved. This information will then be brought back to the VPN control node of the original domain 10E.

This particular embodiment has the advantage that not the entire system 1 has to be updated in every single VPN control node 43. However, instead the finding of the VPN will be somewhat more complicated.

In an alternative embodiment, the VPN connection request is sent directly to one, several or all of the other VPN control nodes in the other domains in the total system, not restricted to the neighboring domains. This means that the request is not forwarded in a chain as in the other embodiment, but merely broadcasted through the system. The availability of such direct request forwarding can be regulated by domain SLAs.

Figure 6A:
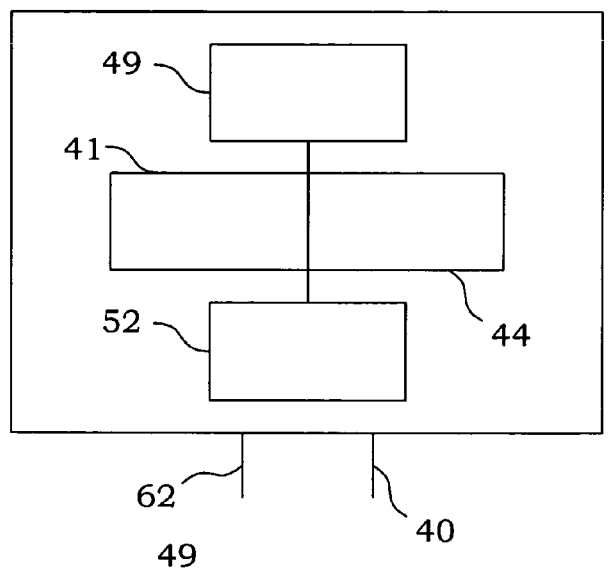
FIG. 6A is a block scheme of an example embodiment of a general VPN control node.

FIG. 6A illustrates a block scheme of a particular embodiment of a relatively general VPN control node 43. The VPN control node 43 comprises means 52 for providing domain VPN information. This information may be provided by other nodes in the domain by connections 62. A main control communication interface 40 is provided for communication with other domains. This interface 40 may be arranged in combination with the intra-domain connections 62. A matching unit 49 investigating if an identity of a requested VPN matches with domain VPN information is provided. The VPN request can be received from another domain, from another node of the own domain or a VPN connect request can be initiated within the VPN control node An external VPN handling section 44 is responsible for handling interdomain VPN configuration. An internal VPN handling section 41 has functionalities for configuring internal connections within the own domain.

Figure 6B:
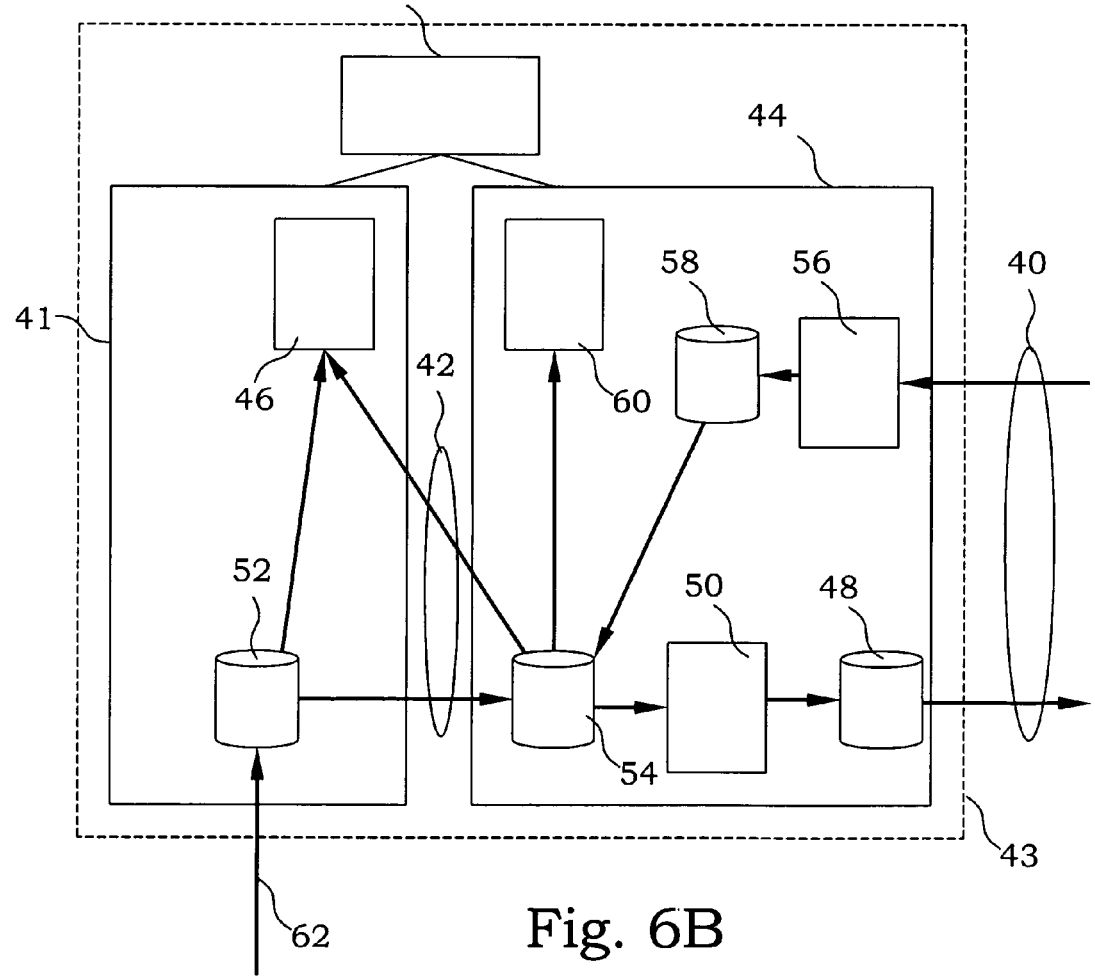
FIG. 6B is a block scheme of another example embodiment of a VPN control node.

FIG. 6B illustrates a block scheme of another particular embodiment of a VPN control node 43. Domain VPN information regarding the own domain is provided by an internal VPN handling section 41. The internal domain VPN information is in this particular embodiment stored in a data memory 52. This information is in this particular embodiment provided, as illustrated by the arrow 62, by communication with other nodes within the domain. In other embodiments, this information can be obtained in other ways. The internal domain VPN information is also forwarded to a total VPN information database 54 in an external VPN handling section 44. The internal VPN handling section 41 also comprises an internal configuration machine 46, having functionalities for configuring internal connections within the own domain. The internal VPN handling section 41 is provided with internal domain VPN information, as well as information from the database 54. Communications regarding internal domain matters are thus performed over a connection 42 between the internal VPN handling section 41 and the external VPN handling section 44.

The VPN control node 43 has a main control communication interface 40 with other domains over an interdomain connection. Domain VPN information from other domains are received by the interface 40, and an input processing unit 56 extracts useful information from the received data and stores this external information in an input database 58. In this input database 58, additional information as from which domain the external data was received is also stored. The input database 58 updates the total VPN information database 54 when appropriate. The external VPN handling section 44 also comprises an external configuration machine 60, having functionalities for configuring parts of interdomain connections that are relevant for the domain. This functionality will be described more in detail below.

The external VPN handling section 44 also provides information to other domains. Domain VPN information, associated with the own domain and/or with other domains is extracted from the database 54 and provided to an output data processing unit 50. The retrieved information is processed according to SLAs associated with the different neighbor domains and stored in an output database 48. The SLAs thereby determines what information is allowed to be spread to the different neighboring domains. Domain operators having a close relationship may allow for more transparent exchange of information, whereas domains belonging to non-related operators may apply a more restrictive information exchange. Information about VPN's is transmitted on the interface 40, when suitable.

A matching unit 49 investigating if an identity of a requested VPN matches with domain VPN information is provided. The VPN request can be received from another domain, from another node of the own domain or a VPN connect request can be initiated within the VPN control node itself. When a match between a requested VPN and the VPN information of the VPN control nodes is achieved, a re-configuration of an inter-domain VPN has to be performed. The implementation can be performed in many different ways, using typical procedures known as such in prior art. One exemplifying embodiment will be described below, which assumes that all VPN information is spread across the whole system, i.e. similar to what is illustrated in FIG. 4.

After matching of the VPN connection request for a user, the assumption is that all VPN control nodes in all domains has a VPN database of where to find VPNs in the system. In each domain database, there is "nexthop" information for each VPN ID not presently in the domain, which points out the neighbor domain ID where this VPN ID can be found. In the neighbor domain, there is either a VPN already configured for this VPN ID, or new "nexthop" information where to find the VPN ID. The different databases in the domains can thus be interpreted as "VPN routing tables", that shows how to find ways to already configured VPNs. For each "nexthop" information there may be different policy rules associated. Depending on the policy rules, the VPN control node in each domain can choose to set up VPN connections to one or several of the "nexthop" domains.

Figure 7:
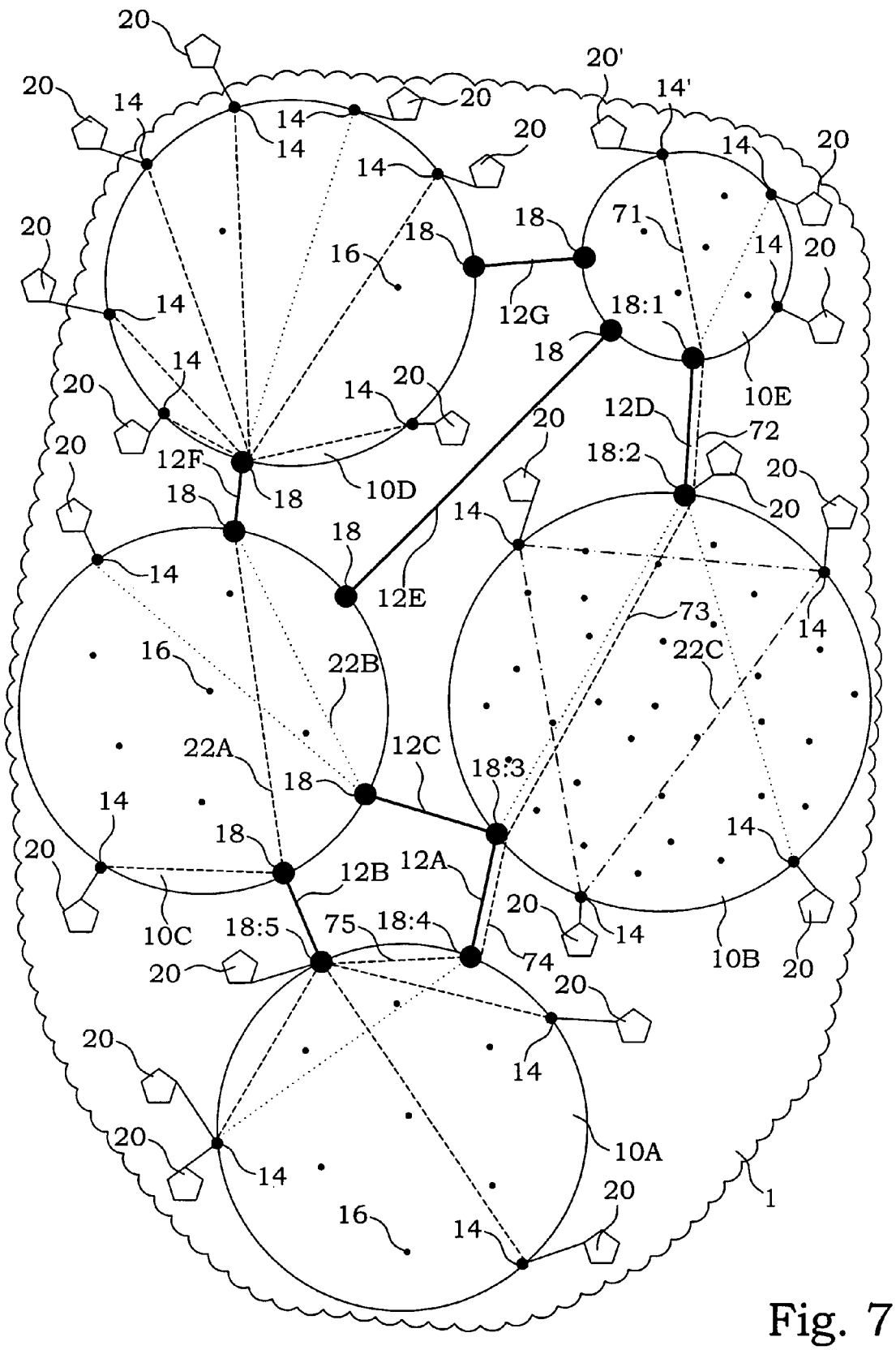
FIG. 7 is a schematic illustration of VPN configuration according to one example embodiment.

An example, illustrated in FIG. 7, shows how the configuration of an interdomain VPN can be automated. A new customer site 20' in the domain 10E shall be connected to VPN 22A. It is assumed that VPN tunnels are used for VPN connections both inside domains and between domains. The following steps are taken.

The VPN control node in domain 10E gets a request, in some way, from the customer to connect to VPN 22A. Since the VPN database of domain 10E shows that the VPN 22A is not present in domain 10E, the VPN control node in domain 10E cannot connect customer site 20' directly to the VPN 22A inside domain 10E. However, a match is found between the connect request and VPN information originated from other domains. The database shows that VPN 22A can be found at "nexthop" 10B, 10C and 10D, presently configured and running in domain 10A, 10C and 10D.

The VPN control node in domain 10E chooses to set up the VPN via the "nexthop" 10B only. It sets up a VPN tunnel 71 for VPN 22A from the edge node 14' where the customer site 20' is connected, to the border node 18:1, which is connected to domain 10B via link 12D. The VPN control node in domain 10E initiates communication with the VPN control node in domain 10B and sets up a VPN tunnel 72 for VPN 22A over the link 12D to border node 18:2. Since VPN 22A is not present in domain 10B, the VPN control node in domain 10B checks its VPN database and sees that VPN 22A can be found at "nexthop" 10A and 10C.

The VPN control node in domain 10B chooses to set up the VPN via the "nexthop" 10A only. It sets up a VPN transit tunnel 73 for VPN 22A from the border node 18:2, which is connected to domain 10B via link 12D, to the border node 18:3, which is connected to domain 10A via link 12A. The VPN control node in domain 10B initiates communication with the control node in domain 10A and sets up a VPN tunnel 74 over the link 12A to border node 18:4. Since VPN 22A is present in domain 10A, the control node in domain 10A can set up an internal tunnel 75 from the border node, which is connected to domain 10B via link 12A, to the border node 18:5, which is connected to the VPN 22A.

After each step, the updated VPN databases will be available for the next round of collecting VPN information.

Figure 8:
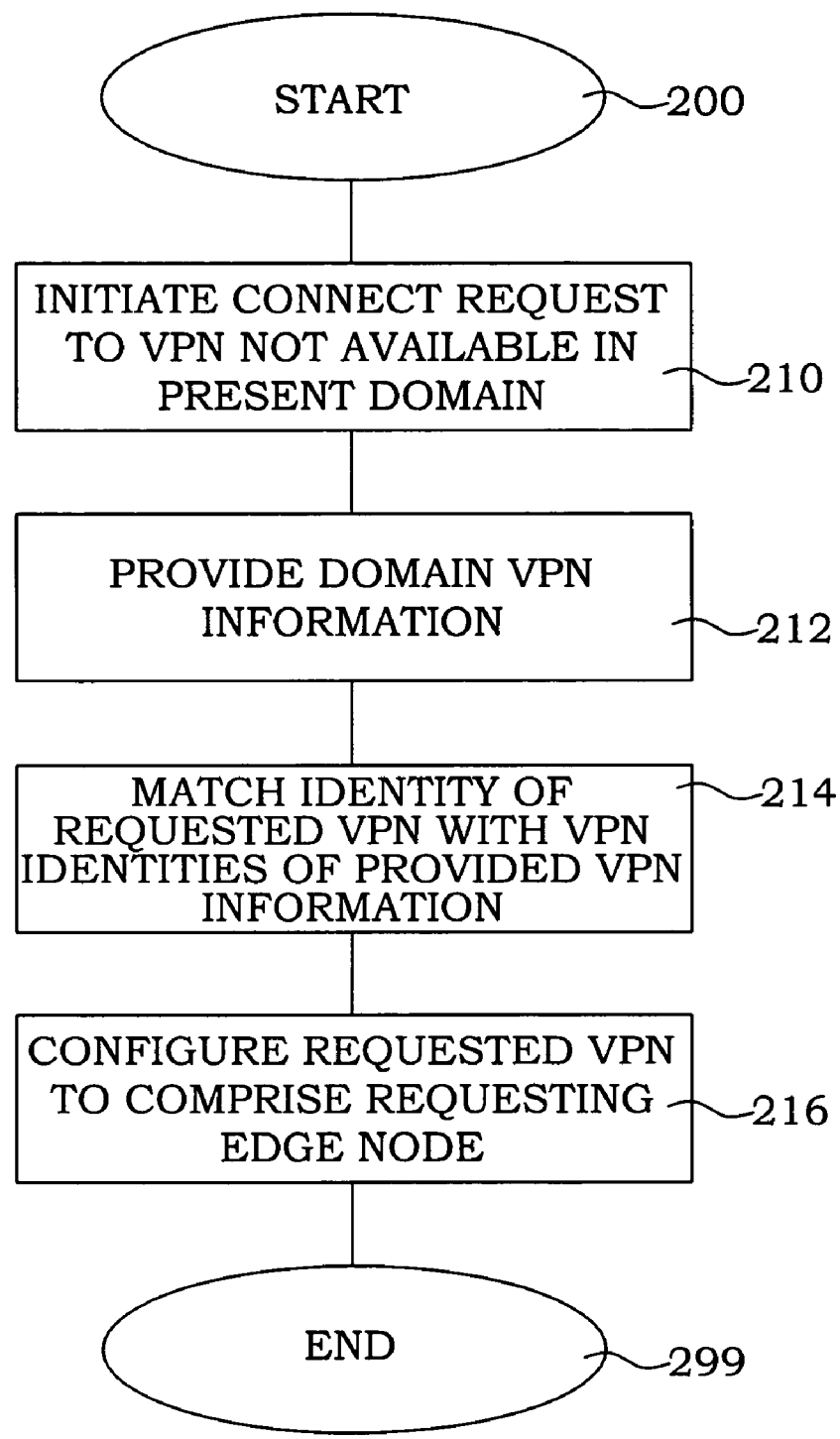
FIG. 8 is a flow diagram illustrating the main steps of an example embodiment of a method.

The basic steps of an embodiment of a method are illustrated in FIG. 8. The procedure starts in step 200. In step 210, a connect request is initiated. This request concerns connecting a first edge node in a first domain to a VPN not presently available in the first domain. In step 212, domain node information is collected. In step 214, an identity of the first VPN is matched to VPN identities of collected node information. Based on the outcome of the matching step, the first VPN is configured to comprise the first edge node, in step 216. The procedure ends in step 299.

The embodiments described above are to be understood as a few illustrative examples. It will be understood by those skilled in the art that various modifications, combinations and changes may be made to the embodiments. In particular, different part solutions in the different embodiments can be combined in other configurations, where technically possible. In particular, any combination of pull/push, inter-/intra-domain, broadcast/neighbor communication and information/request is possible to apply. The scope of the present invention is, however, defined by the appended claims.

The invention claimed is:

1. A method for configuration of a multi-domain virtual private network (VPN) within a communications network comprising the steps of:
   providing domain VPN information within at least two VPN provider domains of the communication network interconnected to each other;
   at least one respective VPN being available in each of the at least two VPN provider domains, the VPNs being available between edge nodes of the at least two VPN provider domains, at which edge nodes customers are connected to the VPNs;
   the domain VPN information comprising at least a VPN identity of VPNs available in a respective VPN provider domain;
   initiating a connect request for connecting a first edge node in a first VPN provider domain to a first VPN not presently available in the first VPN provider domain;
   matching an identity of the first VPN with VPN identities of a second VPN provider domain of the at least two VPN provider domains different from the first VPN provider domain; and
   configuring the first VPN to comprise the first edge node based on the outcome of the matching step,
   wherein the step of matching includes sending an information request about existence of the first VPN from the first VPN provider domain to an adjacent VPN provider domain and returning an acknowledgment to the first VPN provider domain if a match is found, wherein the acknowledgement includes information about which VPN provider domains that have to be transited to reach the VPN provider domain in which the first VPN is available.

2. A method according to claim 1, wherein the step of matching comprises:
   comparing the information request with provided domain VPN information in a VPN provider domain different from the first VPN provider domain.

3. A method according to claim 1, wherein the step of matching comprises the steps of:
   sending an information request about existence of the first VPN from the first VPN provider domain to one, several or all domains; and
   comparing the information request with provided domain VPN information in a VPN provider domain different from the first VPN provider domain.

4. A method according to claim 2, wherein the step of matching further comprises the step of:
   forwarding the information request about existence of the first VPN to further adjacent VPN provider domain if no match is found.

5. A method according to claim 1, wherein the acknowledgement additionally comprises data representing at least one of:
   domain ID of VPN provider domain in which the first VPN is available;
   edge node ID of edge node in which the first VPN is available;
   routing information to the edge node in which the first VPN is available.

6. A method according to claim 1, wherein the step of matching comprises the steps of:
   processing the domain VPN information into processed VPN information comprising at least one VPN identity;
   transferring the processed VPN information between adjacent VPN provider domains;
   comparing the identity of the first VPN with the transferred processed VPN information.

7. A method according to claim 1, wherein the step of matching in turn comprises the steps of:
   processing the domain VPN information into processed VPN information comprising at least one VPN identity;
   transferring the processed VPN information to one, several or all VPN provider domains;
   comparing the identity of the first VPN with the transferred processed VPN information.

8. A method according to claim 6, wherein the step of matching comprises the further step of further processing the transferred processed VPN information before the comparing step.

9. A method according to claim 6, wherein the processed VPN information to be transferred to other VPN provider domains additionally comprises processed VPN information received from adjacent VPN provider domains.

10. A method according to claim 9, wherein the step of processing comprises addition of transit information regarding the processed VPN information transferred from other VPN provider domains or information derived therefrom.

11. A method according to claim 6, wherein the processed VPN information additionally comprises at least one of:
    domain ID of VPN provider domains in which different VPNs are available;
    edge node ID of edge nodes at which different VPNs are available;
    information about which VPN provider domains that has to be transited to reach the VPN provider domain in which different VPNs are available; and
    routing information to the edge node at which different VPNs are available.

12. A method according to claim 6, wherein the step of transferring of processed VPN information is performed on a repeated basis.

13. A method according to claim 6, wherein the step of transferring of processed VPN information is performed as a response on changes of domain VPN information.

14. A method according to claim 6, wherein the step of transferring of processed VPN information is performed as a response of the connect request.

15. A method according to claim 1, wherein the domain VPN information further comprises customer identities of customers connected to the respective edge nodes and associated VPN.

16. A method according to claim 1, wherein the domain VPN information further comprises properties of the VPNs.

17. A method according to claim 16, wherein the properties of the VPNs comprise at least one of:
    quality of service properties;
    encryption properties;
    transparency layer properties;
    tunneling properties; and
    topology properties.

18. A method according to claim 1, wherein the step of providing domain VPN information comprises collecting domain VPN data from edge nodes within the same VPN provider domains.

19. A method according to claim 18, wherein the collecting of domain VPN data is performed in a centralized manner in at least one VPN provider domain.

20. A method according to claim 18, wherein the collecting of domain VPN data is performed in a distributed manner in at least one VPN provider domain.

21. A method according to claim 18, wherein the collecting of domain VPN data is performed by a push mechanism.

22. A method according to claim 18, wherein the collecting of domain VPN data is performed by a pull mechanism.

23. A communications network, comprising:
- at least two virtual private network (VPN) provider domains being interconnected by connections between border nodes;
- means for operating VPNs within the communications network;
- edge nodes connected by the VPNs, wherein customer sites of the VPNs are connected at the edge nodes;
- at least one respective VPN being available in each of the at least two VPN provider domains;
- means for initiating a connect request for connecting a first edge node in a first VPN provider domain to a first VPN not presently available in the first VPN provider domain;
- VPN control nodes in each of the at least two network VPN provider domains comprising means for providing domain VPN information;
- the domain VPN information comprising at least a VPN identity of VPNs available in the VPN provider domain;
- means for matching an identity of the first VPN with VPN identities of a second VPN provider domain of the at least two VPN provider domains different from the first VPN provider domain; and
- means for configuring the first VPN to comprise the first edge node based on the output of the means for matching,
- wherein the means for matching includes request handling means for sending and receiving information requests about existence of a particular VPN to and from an adjacent VPN provider domain and for returning an acknowledgement if a match is found, and wherein the acknowledgement includes information about which VPN provider domains that have to be transited to reach the VPN provider domain in which the first VPN is available.

24. A communications network according to claim 23, wherein the VPN control node is a centralized node in at least one VPN provider domain.

25. A communications network according to claim 23, wherein the VPN control node is a distributed node in at least one VPN provider domain.

26. A communications network according to claim 25, wherein at least a part of the distributed VPN control node is in logical connection with a border node, and wherein communication between the distributed VPN control node and VPN provider domains connected through the border node takes place via the border node.

27. A communications network according to claim 23, wherein the VPN control node comprises a storage for VPN information.

28. A communications network according to claim 23, wherein the means for matching is distributed in all VPN provider domains, which distributed parts comprise:
- means for comparing received information requests with provided domain VPN information of its own VPN provider domain.

29. A communications network according to claim 23, wherein the means for matching is distributed in all VPN provider domains, which distributed parts comprise:
- request handling means for sending and receiving information requests about existence of a particular VPN to and from one, several or all VPN provider domains; and
- means for comparing received information requests with provided domain VPN information of its own VPN provider domain;
- the request handling means is further arranged for returning an acknowledgement if a match is found.

30. A communications network according to claim 28, wherein the request handling means is further arranged to forward an information request to further adjacent VPN provider domains if no match is found.

31. A communications network according to claim 23, wherein the VPN control node further comprises:
- first processor for processing the domain VPN information into processed VPN information, connected to the storage; and
- means for transferring the processed VPN information to other VPN provider domains, connected to the first processor.

32. A communications network according to claim 31, wherein the VPN control node further comprises:
- means for receiving processed VPN information from other VPN provider domains;
- second processor for processing the received processed VPN information, connected to the means for receiving and the storage allowing the processed received VPN information to be stored in the storage.

33. A communications network according to claim 23, wherein the VPN control nodes in at least one network VPN provider domain comprises means for collecting domain VPN information from edge nodes in the same VPN provider domain.

34. A VPN control node in a first VPN provider domain of a communications network having at least two VPN provider domains and supporting multi-domain virtual private networks (VPNs), at least one respective VPN being available in each of the at least two VPN provider domains, customers being connected to the VPNs at edge nodes of the at least two VPN provider domains, the VPN control node comprising electronic circuitry configured to:
- provide domain VPN information;
- the domain VPN information comprising at least a VPN identity of VPNs available within a respective VPN provider domain;
- send an information request about existence of a first VPN in a second VPN provider domain; match an identity of the first VPN with the VPN identities of the second VPN provider domain; and
- process an acknowledgment received from a VPN provider domain other than the first VPN provider domain if a match is found that includes information about which VPN provider domains that have to be transited to reach the VPN provider domain in which the first VPN is available.

35. A VPN control node according to claim 34, further comprising a configuring machine for VPN connections within the first VPN provider domain.

36. A VPN control node according to claim 34, further comprising a configuring machine for inter-domain VPN connections involving the first VPN provider domain.

37. A VPN control node according to claim 34, wherein the control node is a centralized node.

38. A VPN control node according to claim 37, wherein the electronic circuitry is configured to communicate with VPN control nodes in other VPN provider domains via border nodes.

39. A VPN control node according to claim 37, wherein the electronic circuitry is configured to communicate by dedicated VPN control signal connections with VPN control nodes in other VPN provider domains.

40. A VPN control node according to claim 34, wherein the control node is a distributed node.

41. A VPN control node according to claim 40, wherein at least a part of the distributed control node is in logical connection with a border node, through which data communication to neighboring domains takes place.

42. A VPN control node according to claim 34, wherein the control node comprises a storage for VPN information.

43. A VPN control node according to claim 42, wherein the storage for VPN information is centralized.

44. A VPN control node according to claim 42, wherein the storage for VPN information is distributed.

45. A VPN control node according to claim 34, wherein the electronic circuitry is configured to communicate domain VPN information to and from other VPN provider domains.

46. A VPN control node according to claim 34, wherein the electronic circuitry is configured to forward a VPN request to other VPN provider domains if no match is found.

47. A VPN control node according to claim 34, wherein the electronic circuitry is configured to collect domain VPN information from edge nodes in the same VPN provider domain.

48. A VPN control node according to claim 47, wherein the electronic circuitry is configured to collect domain VPN information according to a push mechanism.

49. A VPN control node according to claim 47, wherein the electronic circuitry is configured to collect domain VPN information according to a pull mechanism.

* * * * *